US012546045B2

(12) United States Patent
Ansaldi

(10) Patent No.: US 12,546,045 B2
(45) Date of Patent: Feb. 10, 2026

(54) HOUSEHOLD APPLIANCE PARTICULARLY SUITABLE FOR USE IN A HYBRID ELECTRICAL POWER SYSTEM AND HYBRID ELECTRICAL POWER SYSTEM COMPRISING THE SAME

(71) Applicant: LA LEONARDO SRL, Rome (IT)

(72) Inventor: Pieluigi Ansaldi, Lucca (IT)

(73) Assignee: LA LEONARDO SRL, Rome (IT)

( * ) Notice: Subject to any disclaimer, the term of this patent is extended or adjusted under 35 U.S.C. 154(b) by 0 days.

(21) Appl. No.: 18/252,229

(22) PCT Filed: Nov. 8, 2021

(86) PCT No.: PCT/IB2021/060318
§ 371 (c)(1),
(2) Date: May 9, 2023

(87) PCT Pub. No.: WO2022/097109
PCT Pub. Date: May 12, 2022

(65) Prior Publication Data

US 2023/0407543 A1 Dec. 21, 2023

(30) Foreign Application Priority Data

Nov. 9, 2020 (IT) ........................ 202020000006251

(51) Int. Cl.
*D06F 34/05* (2020.01)
*D06F 34/10* (2020.01)
(Continued)

(52) U.S. Cl.
CPC .............. *D06F 34/10* (2020.02); *D06F 34/05* (2020.02); *D06F 34/28* (2020.02); *D06F 37/304* (2013.01);
(Continued)

(58) Field of Classification Search
CPC .......... D06F 34/10; D06F 34/05; D06F 34/28; D06F 37/304; D06F 2105/00;
(Continued)

(56) References Cited

U.S. PATENT DOCUMENTS

2006/0006742 A1* 1/2006 Galm ...................... H02J 3/007 307/87
2011/0109165 A1* 5/2011 Hahn ...................... H02J 3/381 307/72
(Continued)

FOREIGN PATENT DOCUMENTS

JP 2003224892 * 8/2003
JP 2003224892 A 8/2003

OTHER PUBLICATIONS

International Search Report and Written Opinion issued on Apr. 7, 2022, in corresponding International Application No. PCT/IB2021/060318, 10 pages.

*Primary Examiner* — Rexford N Barnie
*Assistant Examiner* — Xuan Ly
(74) *Attorney, Agent, or Firm* — Maier & Maier, PLLC

(57) ABSTRACT

A household appliance particularly suitable for use in a hybrid electrical power supply system including a household appliance body and at least one drive motor of the household appliance connected to a processing and control board, and at least one electrical power storage element and the processing and control board is configured to manage the charging and discharging of the at least one electrical power storage element according to a consumption of the at least one drive motor.

14 Claims, 4 Drawing Sheets

10
16b
11
17
12
19
18
15
16c
13
14
16a

(51) Int. Cl.

| | |
|---|---|
| ***D06F 34/28*** | (2020.01) |
| ***D06F 37/30*** | (2020.01) |
| ***H02J 3/00*** | (2006.01) |
| ***H02J 3/007*** | (2026.01) |
| ***H02J 3/46*** | (2006.01) |
| ***H02J 7/00*** | (2006.01) |
| ***H02J 7/34*** | (2006.01) |
| *D06F 105/00* | (2020.01) |

(52) U.S. Cl.
CPC .............. *H02J 3/0075* (2020.01); *H02J 3/46* (2013.01); *H02J 7/0048* (2020.01); *H02J 7/34* (2013.01); *D06F 2105/00* (2020.02); *H02J 2300/24* (2020.01)

(58) Field of Classification Search
CPC . D06F 37/30; H02J 3/0075; H02J 3/46; H02J 7/0048; H02J 7/34; H02J 2300/24; H02J 3/00; H02J 7/00; Y02B 40/18
USPC ............................................................ 307/52
See application file for complete search history.

(56) References Cited

U.S. PATENT DOCUMENTS

| | | | | |
|---|---|---|---|---|
| 2020/0251914 | A1* | 8/2020 | Arnold .................. | H02J 7/0044 |
| 2021/0083505 | A1* | 3/2021 | Beaston .................. | H02J 3/381 |

* cited by examiner

HOUSEHOLD APPLIANCE PARTICULARLY SUITABLE FOR USE IN A HYBRID ELECTRICAL POWER SYSTEM AND HYBRID ELECTRICAL POWER SYSTEM COMPRISING THE SAME

FIELD

The present invention relates to a household appliance particularly suitable for use in a hybrid electrical power supply system and an electrical power supply system comprising the same. In particular, the present invention relates to a household appliance capable of storing power generated by an alternative power source and fed into the hybrid electrical power supply system, allowing it to operate temporarily autonomously and/or to act as an emergency power source, in the event of failure of the conventional power supply system and in the absence of power generated by the alternative power source.

BACKGROUND

In the state of the art, it is known to support traditional electrical power supply by means of systems generating electrical power from alternative electrical power sources, such as photovoltaic power supply systems that generate electrical power from solar power. Similarly, they are known other power supply systems that generate electrical power from alternative power sources, such as hydroelectric systems, wind power systems or thermal and electrical power cogeneration systems.

By way of example, photovoltaic power supply systems normally comprise a series of silicon panels capable of transforming part of the sun radiation into electrical power. The panels generate direct electrical current which is then converted into alternating current by an inverter. When the panels are operating, the power produced is consumed by grid-connected users instead of electrical power from the traditional grid. In the absence of total consumption, the exceeding power generated by the photovoltaic panels is stored in specific storage batteries. Similarly, the other types of systems generating electrical power from alternative power sources usually use storage batteries.

Such storage batteries have the disadvantage of being rather bulky and delicate. Storage batteries can be placed either upstream or downstream of the inverter. In any case, as these elements can be easily damaged, it is not recommended to place them outdoors, as climatic factors and the presence of insects could deteriorate the storage system. It is therefore necessary to find a dedicated location inside houses that is large enough and at the same time that allows storage batteries to be hidden, in order to preserve the overall appearance of the domestic environment.

Furthermore, the storage batteries used jointly with systems generating electrical power from alternative power sources are not often able to provide the power needed to supply several high-consumption household appliances such as washing machines or dishwashers at the same time, they are therefore unable to ensure completing an operating cycle of such household appliances or, in any case, a continuity of power supply in the event of a failure or disruption of the traditional power supply grid and in the absence of power from alternative power sources, such as at night for photovoltaic systems, in the absence of wind for wind power systems, and so on.

Furthermore, known hybrid electrical power supply systems are usually managed in such a way as to mix power supply from the electricity grid with power provided by storage batteries, preventing a complete discharge of the battery. However, this has a negative effect on the average life of such batteries.

The Applicant has therefore highlighted the need to create a household appliance particularly suitable for use in a hybrid electrical power supply system that is capable of operating even without storage batteries placed in dedicated spaces within a house.

The Applicant has also acknowledged the need to design a household appliance particularly suitable for use in a hybrid electrical power supply system which, in the absence of power supply from the traditional electrical power grid and from the alternative power source, is sufficiently autonomous in operating such to ensure that it can complete one operating cycle of the household appliance itself and/or is able to provide power supply to the local grid.

SUMMARY

The object of the present invention is thus to overcome the drawbacks of the prior art, in particular by designing a household appliance particularly suitable for use in a hybrid electrical power supply system that makes the use of storage batteries placed in dedicated spaces within a house unnecessary and that is capable of operating autonomously in the absence of power supply from the traditional electrical power grid and from the system for generating electrical power from alternative power sources.

Therefore, in its most general terms, the present invention relates to a household appliance particularly suitable for use in a hybrid electrical power supply system comprising a household appliance body and at least one household appliance drive motor connected to a processing and control board.

Advantageously, according to the invention, the household appliance comprises at least one electrical power storage element. In addition, the processing and control board is configured to manage the charging and discharging of the at least one electrical power storage element according to a consumption of the at least one drive motor.

The Applicant has realised that by placing electrical power storage elements inside household appliances a number of advantages can be achieved including obviating the need to place storage elements inside a house.

In addition, the presence of a plurality of storage elements (ideally one for each appliance) allows for an increase in the amount of electrical power resulting from solar power that can be harnessed during the day.

There is also the possibility of managing the storage elements for the power supply of the specific household appliance, enabling, on the one hand, the household appliance to be autonomous in case of failure of the electrical power grids and, on the other hand, to complete the discharge cycles of the storage elements, thereby extending their average life.

The present invention also aims at implementing a hybrid electric power supply system that optimises the consumption of electrical power generated from solar power and preserves the operation of the storage batteries for increased times.

The present invention therefore also relates to a hybrid electrical power supply system comprising a disconnection and protection switchboard connected at the input to an inverter for transforming the direct current generated by a system for generating electrical power from alternative power sources, into alternating current, and to an electrical power counter for the electrical power from a global electrical grid, the inverter and the electrical power counter making available electrical power in a local electrical power grid. Conveniently, according to the invention, at least one household appliance as described above is connected to the local electrical power supply grid.

The hybrid electrical power supply system according to the invention therefore has the same advantages as described above referring to the household appliance.

The household appliance and the hybrid electrical power supply system according to the present invention may include one or more of the following additional features, which may also be combined with each other as desired in order to meet specific requirements defined by a corresponding application purpose.

In a variant of the invention, the processing and control board is connected to a local electrical power grid, preferably through the interposition of a differential switch and/or magneto-thermal switch; in addition, the processing and control board is additionally configured to manage the charging and discharging of the at least one electrical power storage element based on the consumption of the local electrical power grid.

In a variant of the invention, the at least one electrical power storage element is located inside the body of the household appliance, the at least one electrical power storage element being preferably a lead battery.

In a variant of the invention, the at least one electrical power storage element is located at at least one wall of the appliance body, more preferably at an upper wall, a lower wall and/or at least a side wall.

In one variant of the invention, the processing and control board is positioned at a rear wall of the household appliance body so as to be accessible from outside.

In one variant of the invention, the processing and control board is of the electronic or electro-mechanical type.

In a variant of the invention, the household appliance additionally comprises a control panel for selecting the operating parameters of the household appliance and is additionally configured to perform at least one of:

- displaying the status of the electrical power storage elements;
- allowing to select a sequence whereby electrical power storage elements are used for power delivery; and
- allowing to choose a power supply source by which the electrical power storage elements are recharged.

In one variant of the invention, the control panel is connected to a wireless interface. Preferably, the wireless interface is of a type that supports at least one of the wireless standards such as Bluetooth or WiFi, more preferably converting them from a powerline signal.

Advantageously, this allows to communicate with the household appliance via a device such as a smartphone or tablet PC, being capable of controlling operation thereof. In addition, the household appliance can thereby be integrated into a home automation system or domotic system.

In a variant of the invention, the disconnection and protection switchboard of the hybrid electrical power supply system is connected to a control and management apparatus configured to manage the delivery of electric power from the inverter as an alternative or in addition to the electric power from the global grid to the local electrical power supply grid.

Preferably, the control and management apparatus is configured to manage the delivery of the power stored in the at least one electrical power storage element to the local electrical power supply grid.

Preferably, the control and management apparatus is configured to drive the transition from a first power source to a second power source by introducing a delay of activation of the first source with respect to an instant of deactivation of the second source.

BRIEF DESCRIPTION OF THE DRAWINGS

Further features and advantages of the present invention will better appear from the following detailed description of certain preferred embodiments thereof made with reference to the appended drawings. The different features in the individual configurations may be combined with one another as desired according to the preceding description, should there be advantages specifically resulting from a specific combination.

In such drawings.

DETAILED DESCRIPTION

Figure 1:
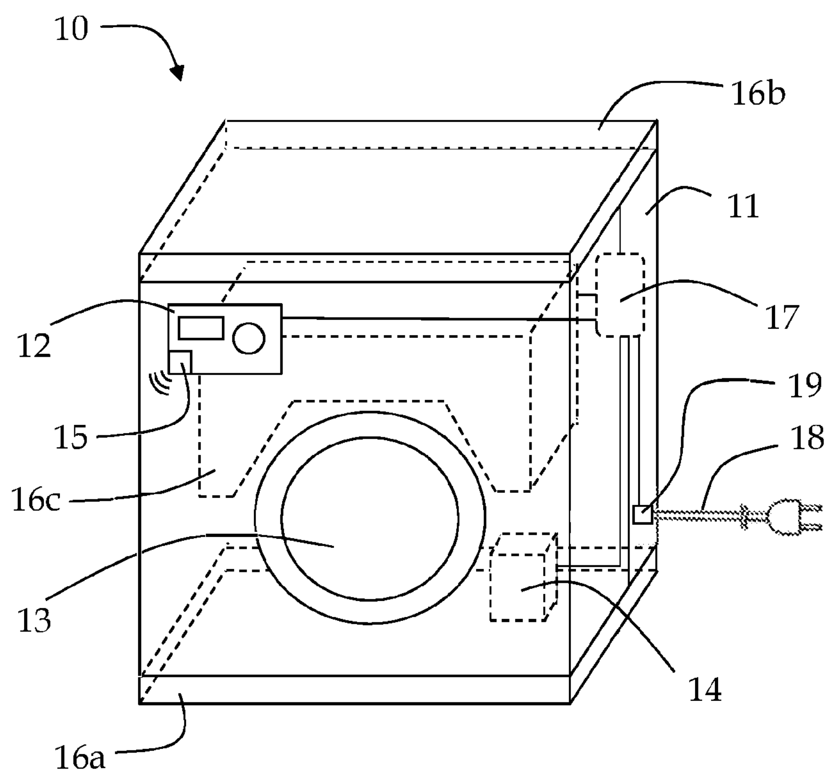
FIG. 1 is a schematic representation of a household appliance particularly suitable for use in a hybrid electrical power supply system according to a preferred embodiment of the present invention.

While the invention is susceptible to various modifications and alternative constructions, certain preferred embodiments are shown in the drawings and will be described hereinbelow in detail. It must in any case be understood that there is no intention to limit the invention to the specific embodiment shown, but, on the contrary, the invention intends to cover all the modifications, alternative and equivalent constructions that fall within the scope of the invention as defined in the claims.

The use of "for example", "etc.", "or" indicates non-exclusive alternatives without limitation, unless otherwise indicated. The use of "includes" means "includes, but not limited to" unless otherwise indicated.

With reference to the figures, a household appliance is shown which is particularly suitable for use in a hybrid electrical power supply system, collectively referred to by 10, which in the embodiment shown is a washing machine. Similarly, the household appliance according to the present invention may be any large household appliance such as a dishwasher, washer-dryer, refrigerator and so on.

The washing machine 10 comprises, in a known manner, a household appliance body 11 within which a washing system (not shown) is housed that is accessible through a front door 13 usually shaped like a porthole and driven by at least one drive motor, schematically shown in the figure with the block indicated with number 14. The washing system may comprise, among other things, a drum rotatably housed in the body of the household appliance 11, a hydraulic circuit for conveying and discharging water, and so on.

A control panel 12 for selecting programmes and washing parameters is also provided. In particular, the control panel 12 is connected to a wireless interface 15 for communicating with at least one electronic device of the user, such as a smartphone, tablet-PC or other similar device. The wireless interface 15 is of a type suitable to support at least one of the wireless standards such as Bluetooth or WiFi and possibly convert them from a powerline signal.

According to the present invention, the household appliance 10 additionally comprises at least one processing and control board 17 of the electronic or electro-mechanical type, for example positioned on the rear wall of the household appliance body 11, connected to at least one electrical power storage element 16*a*, 16*b*, 16*c*, located inside or adjacent to the household appliance body 11. The electrical power storage element 16*a*, 16*b*, 16*c* is preferably a lithium-ion battery or, alternatively, a lead battery. In FIG. 1 three electrical power storage elements 16*a*, 16*b*, 16*c* are shown, two of which 16*a*, 16*b* are located outside and one inside 16*c* the body of household appliance 11.

In case the electrical power storage element 16*a*, 16*b*, 16*c* is positioned outside the household appliance body 11, it may be located—as shown in FIG. 1—at the upper wall and/or the lower wall of the body 11. As an alternative or in addition, the electrical power storage element 16*a*, 16*b*, 16*c* may be positioned at the side walls or sides of the body 11 (configuration not shown).

In case the electrical power storage element 16*a*, 16*b*, 16*c* is positioned inside the body 11, it is possible, for example, to arrange it in place of the concrete ballast usually present in washing machines or in another suitable location. In this case, it is preferable to use a lead battery with the appropriate weight characteristics to act as a ballast.

Figure 2:
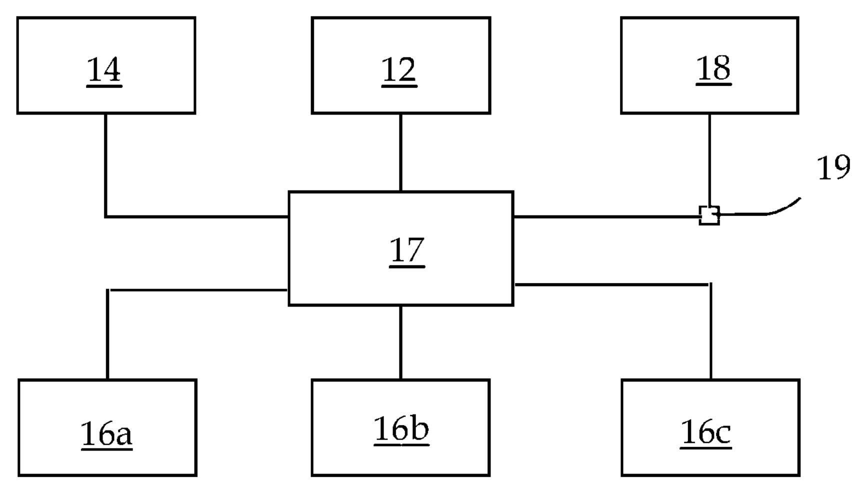
FIG. 2 is a block diagram of the connections between the components inside the household appliance in FIG. 1.

As schematically shown in FIG. 2, the processing and control board 17 is also connected to a local electrical power supply grid 18, preferably generated by a hybrid electrical power supply system 100 (for example as described hereinafter with reference to FIG. 4), by interposing a differential switch and/or a circuit magneto-thermal switch 19.

Finally, the processing and control board 17 is connected to the control panel 12 to receive control signals of the drive motor 14 and to the drive motor 14 in order to control operation thereof.

In detail, the processing and control board 17 is configured to manage the electrical power input to the household appliance, the consumption of all the components constituting it, schematised in the figure through the drive motor 14, as well as the electrical power output from the household appliance. In particular, the processing and control board 17 is configured to allow the delivery of electrical power from the storage elements 16*a*, 16*b*, 16*c* towards the local grid 18 only if the power required by the grid 18 does not exceed a maximum threshold, defined in relation to the power required for the operation of the household appliance itself 10, thereby in primis ensuring the operation of the household appliance 10.

Figure 3:
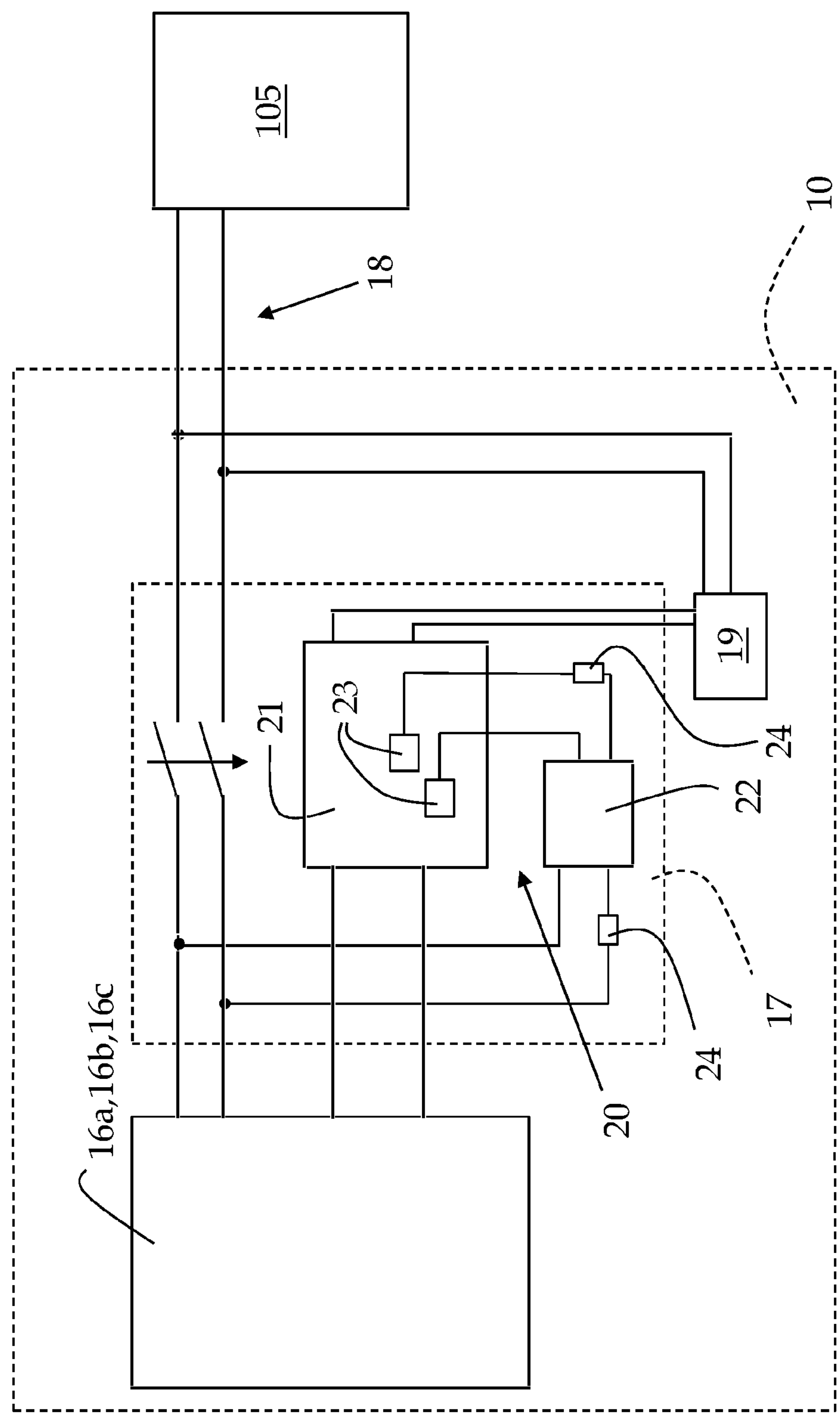
FIG. 3 is a schematic representation of a local safety circuit preferably included in the household appliance according to the present invention.

Moreover, as schematically shown in FIG. 3, the processing and control board 17 may comprise a local safety circuit 20 which ensures that electrical power is delivered from the storage elements 16*a*, 16*b*, 16*c* to the local grid 18 only in the absence of power from the local grid 18.

To this end a contact switchboard 21 and a minimum voltage coil 22 are used to control the switching. The minimum voltage coil 22 is connected at the input to the power supply grid 18, by means of the interposition of protection elements 24, being normally in an energised coil condition.

When the power supply from the local grid 18 is lacking, the coil is de-energised, shutting off the power supply to a pair of coils 23 inside the contact switchboard 21. This determines the switching of the contacts inside the switchboard 21 leading to connect the output terminals of the storage elements 16*a*, 16*b*, 16*c* to the local grid 18, by means of the interposition of the differential and/or magneto-thermal switch 19.

The control panel 12, in addition to the parameters traditionally selectable by the user and different depending on the type of household appliance, is configured to display the status of the electrical power storage elements 16*a*, 16*b*, 16*c* and to allow selecting the sequence whereby these elements 16*a*, 16*b*, 16*c* are used for power delivery, as well as the power source by which they are recharged.

Figure 4:
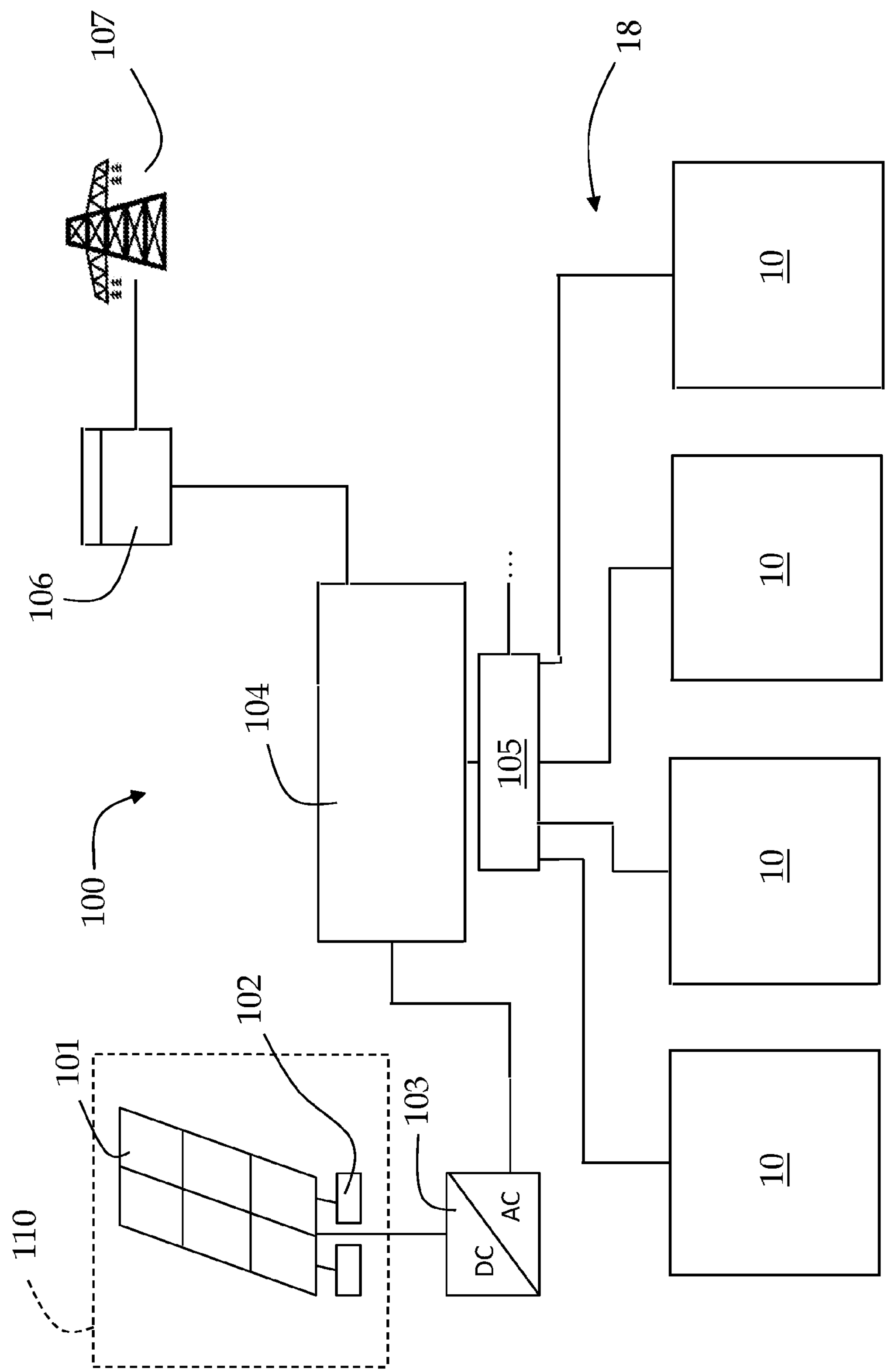
FIG. 4 is a schematic representation of a hybrid power supply system using at least one household appliance according to the present invention.

The household appliance 10 according to the present invention is particularly suitable for use in a hybrid electrical power supply system 100, as schematically shown in FIG. 4.

The hybrid electrical power supply system in FIG. 4 includes in a known manner a system for generating electrical power from alternative power sources 110, shown by way of example as a photovoltaic system.

The photovoltaic system 110 shown comprises a plurality of photovoltaic panels 101 connected in rows to respective string switchboards 102. The string switchboard 102 are in turn connected to an inverter 103 to transform the direct current generated by the photovoltaic panels 101 from solar power into alternating current.

The inverter 103 supplies the electrical power generated by the photovoltaic panels to a disconnection and protection panel 104, which is also connected at its input to an electrical power counter 106 that supplies the switchboard 104 with power from the global electrical power grid 107. The disconnection and protection panel 104 is also connected to a control and management apparatus 105 that manages the delivery of electrical power from the inverter 103 as an alternative or in addition to the electrical power from the global grid 107 towards the local electrical power supply grid 18.

According to the present invention, the disconnection and protection switchboard 104 provides power supply to at least one household appliance 10 provided with at least one electrical power storage element 16*a*, 16*b*, 16*c*. This makes the use of specific storage batteries unnecessary, so there is no need to find a dedicated location for them. In addition, the household appliance 10 itself may self-power or deliver to the local electrical power grid 18 the power stored in the at least one electrical power storage element 16*a*, 16*b*, 16*c* to power supply other users such as lighting points or other household appliances without a storage element. The delivery of electrical power by the household appliance 10 is managed by the control and management apparatus 105.

Figure 5:
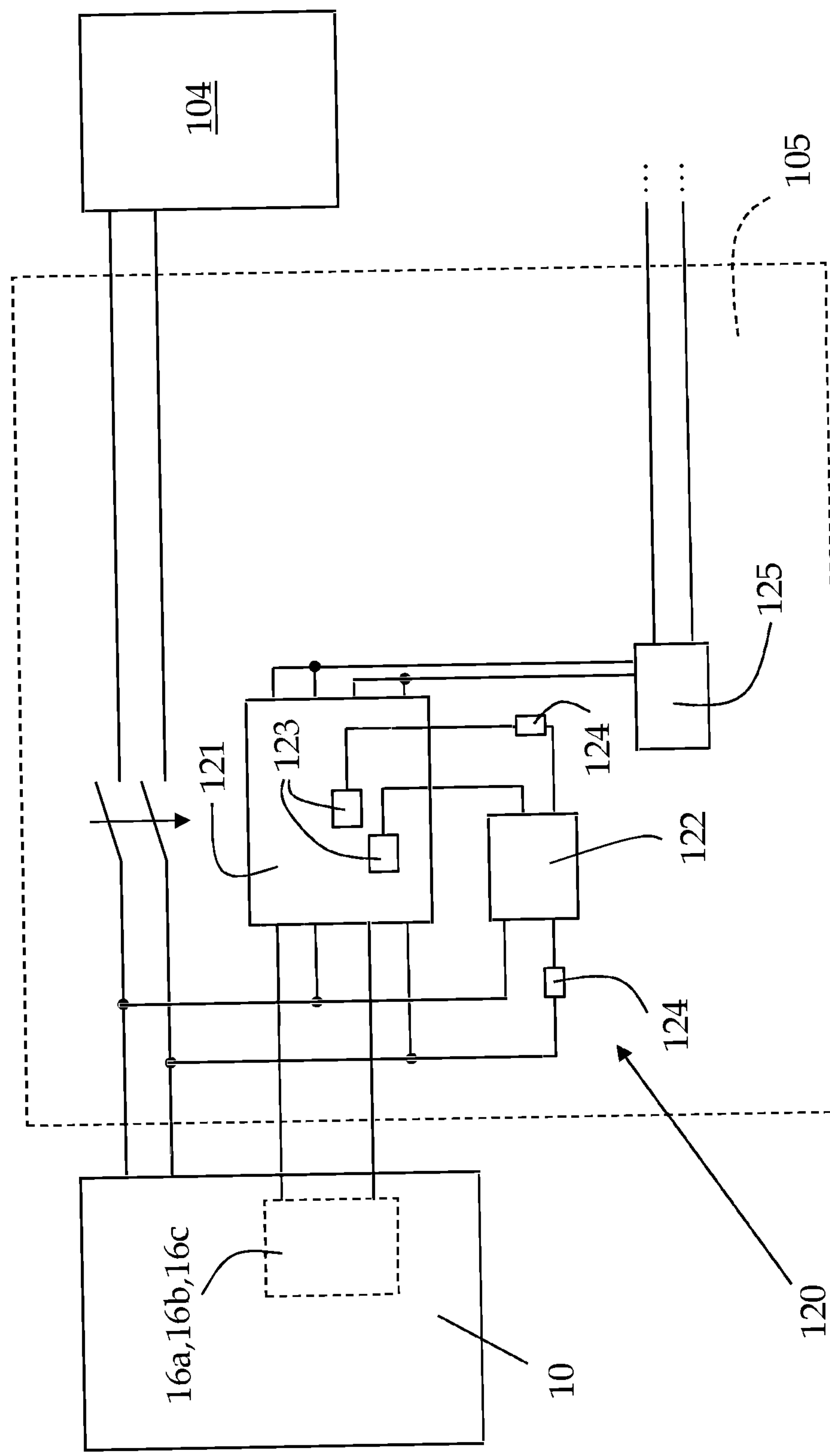
FIG. 5 is a schematic representation of a global safety circuit preferably included in the hybrid electrical power supply system in FIG. 4.

To this end, the control and management apparatus 105 preferably comprises a central safety circuit 120, shown in exemplary terms in FIG. 5, similar to the local safety circuit 20 described with reference to the processing and control board 17 of the household appliance 10.

The central safety circuit 120 comprises a contact switchboard 121 and a minimum voltage coil 122 which drives its switching. Both the minimum voltage coil 122 and the contact switchboard 121 are connected at the input to the switchboard 104 of the supply grid. In particular, the minimum voltage coil 122 is connected to the grid through the interposition of protective elements 124.

Thereby, when the grid supplies power, the minimum voltage coil 122 is in an energized coil condition and the contact switchboard 121 in the condition where the grid power supply is transmitted to the loads connected to the grid via a differential and/or magneto-thermal switch 125.

When the grid power supply is lacking, the minimum voltage coil 122 is de-energised, shutting off the power to a pair of coils 123 inside the contact switchboard 121. This determines the switching of the contacts inside the switchboard 121, switching the connection of the output terminals, which therefore connect the loads connected to the grid to the output of the storage elements 16*a*, 16*b*, 16*c* of the household appliance 10. The delays inherent to the switching of coils 122, 123 ensure a time separation between when the switchboard outputs are connected to the grid voltage and when they are connected to the storage elements 16*a*, 16*b*, 16*c*, thus avoiding a power overlap.

The operation of the household appliance 10 according to the present invention is as follows.

When the power delivered by the system 100 comes from the inverter 103 and exceeds the instantaneous consumption, the processing board 17 of the household appliance 10 conveys the exceeding electrical power to the at least one electrical power storage element 16*a*, 16*b*, 16*c* in order to charge it.

Once the power from the inverter 103 is delivered, the power for the operation of the household appliance 10 is initially drawn from the electrical power storage element 16*a*, 16*b*, 16*c* in order to ensure complete discharge. This also ensures that all the electrical power recovered from solar power is consumed before switching to the use of power from the global electrical power grid 107.

In the event that the household appliance is not in operation, the power stored in each of the electrical power storage elements 16*a*, 16*b*, 16*c* is made available to the local electrical power supply grid 18 in order to still ensure a complete discharge of such storage element 16*a*, 16*b*, 16*c* and/or continuity of electrical power, in the event of a failure or disruption of the global electrical power grid 107. The delivery to the local electrical power supply grid 18 is managed via the control and management apparatus 105 and is controlled via the differential and/or magneto-thermal switch 19.

The control and management apparatus 105 preferably drives the transition from one power source to another by introducing a delay in times of activation of one source (e.g. a storage element 16*a*, 16*b*, 16*c*) with respect to deactivation of a different source (e.g. a second storage element 16*a*, 16*b*, 16*c*, the global electrical power grid 107 or the inverter 103).

The household appliance, which is particularly suitable for use in a hybrid electrical power supply system thus conceived, is subject to numerous modifications and variations, all of which fall within the scope of the attached claims.

Furthermore, all the details can be replaced by other technically equivalent elements.

In practice, the materials used, as well as the shapes and sizes, can be any according to specific implementation needs.

The invention claimed is:

1. A household appliance for use in a hybrid electrical power supply system comprising: a household appliance body and at least one drive motor of the household appliance connected to a processing and control board and further comprising at least one electrical power storage element, wherein the processing and control board is configured to manage the charging and discharging of the at least one electrical power storage element based on a consumption of the at least one drive motor, and wherein the processing and control board is connected to a local electrical power supply grid and is further configured to manage the charging and discharging of the at least one electrical power storage element based on the consumption of the local electrical power supply grid and to allow delivery of electrical power from the at least one electrical power storage towards the local electrical power supply grid, wherein the household appliance is a non-portable household appliance and the at least one electrical power storage element is a storage battery specific for hybrid electrical power supply systems and is located inside the household appliance body.

2. The household appliance according to claim 1, wherein the processing and control board is connected to the local electrical power supply grid by means of the interposition of a differential switch and/or a magneto-thermal switch.

3. The household appliance according to claim 1, wherein the at least one electrical power storage element is located at least one wall of the household appliance body.

4. The household appliance according to claim 1, wherein the processing and control board is positioned at a rear wall of the household appliance body so as to be accessible from outside.

5. The household appliance according to claim 1, wherein the processing and control board is of the electronic or electro-mechanical type.

6. The household appliance according to claim 1, further comprising a control panel for selecting the operating parameters of the household appliance and additionally configured to perform at least one of:

displaying the status of the electrical power storage elements;

allowing to select a sequence whereby the electrical power storage elements are used for power delivery; and allowing to choose a power source by which the electrical power storage elements are recharged.

7. The household appliance according to claim 6, wherein the control panel is connected to a wireless interface.

8. A hybrid electrical power supply system comprising a disconnection and protection switchboard connected at the input to an inverter for transforming direct current generated by a system generating electrical power from alternative power sources, into alternating current, and to an electrical power counter of the electrical power from a global electrical power grid, the inverter and the electrical power counter making available electrical power in a local electrical power supply grid, wherein at least one non-portable household appliance is connected to the local electrical power supply grid, the non-portable household appliance comprising a household appliance body housing at least one drive motor of the household appliance connected to a processing and control board and at least one electrical power storage element, wherein the processing and control board is configured to manage the charging and discharging of the at least one electrical power storage element based on the consumption of the at least one drive motor and on the consumption of the local electrical power supply grid, wherein the disconnection and protection switchboard is connected to a control and management apparatus configured to manage delivery of the power stored in the at least one electrical power storage element housed in the household appliance body to the local electrical power supply grid, and wherein the at least one electrical power storage element housed inside the household appliance body is a storage battery specific for hybrid electrical power supply systems.

9. The hybrid electrical power supply system according to claim 8, wherein the disconnection and protection switchboard is connected to a control and management apparatus configured to manage the delivery of electrical power from the inverter as an alternative to or in addition to the electrical power from the global grid to the local electrical power supply grid.

10. The hybrid electrical power supply system according to claim 9, wherein the control and management apparatus is configured to drive the transition from a first power supply source to a second power supply source by introducing a delay of activation of the first source with respect to an instant of deactivation of the second source.

11. The hybrid electrical power supply system according to claim 9, wherein the system generating electrical power from alternative power sources comprises a plurality of photovoltaic panels connected in rows to respective string switchboard.

12. The hybrid electrical power supply system according to claim 9, wherein the system generating electrical power from alternative power sources is one of a:

a photovoltaic system;

a wind power system;

a hydroelectric system; and a cogeneration system.

13. The household appliance according to claim 1, wherein the at least one electrical power storage element is a lead battery.

14. The household appliance according to claim 1, wherein the at least one electrical power storage element is located at an upper wall, a lower wall, and/or at least a side wall of the household appliance body.

* * * * *